United States Patent Office 3,140,601
Patented July 14, 1964

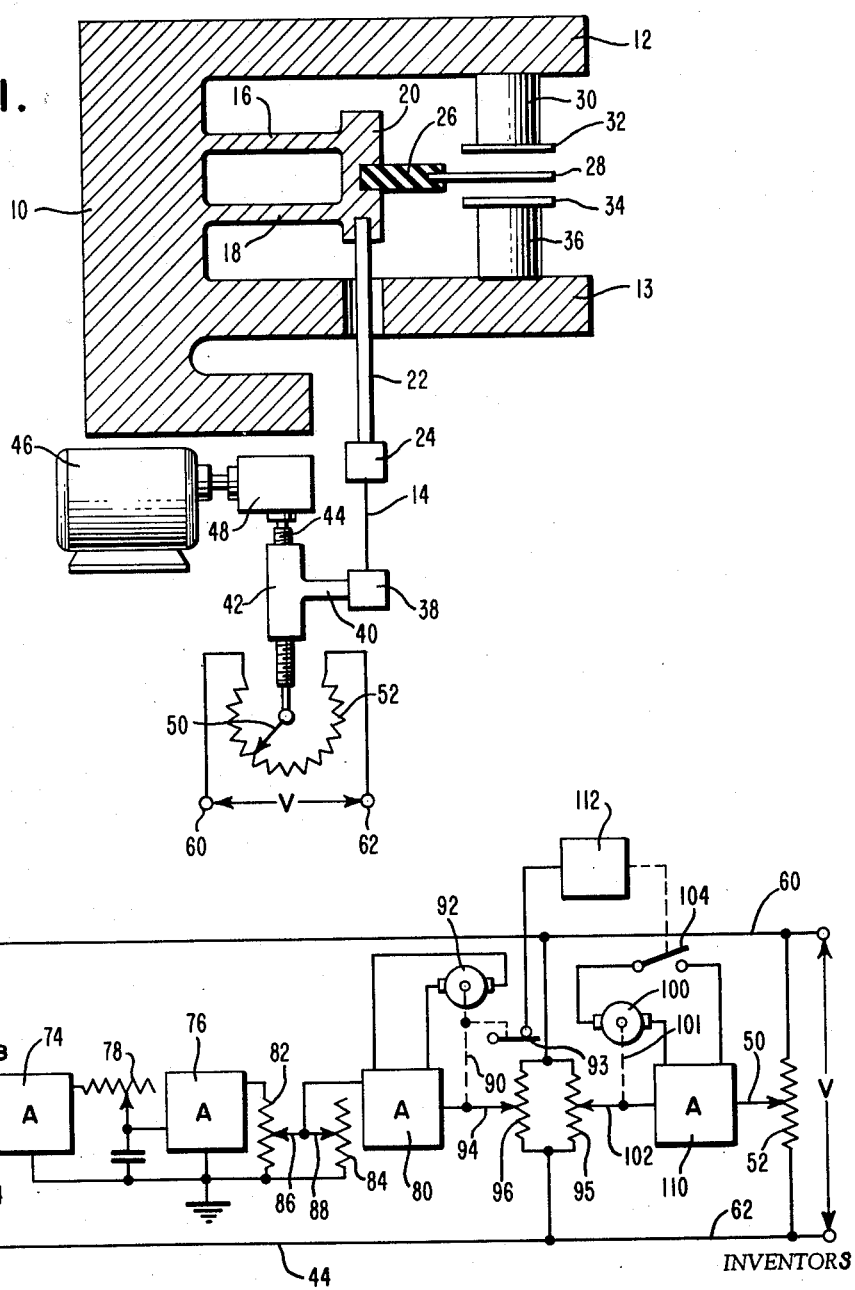

3,140,601
FIBER STRENGTH MEASURING DEVICE
Herman Gerrit Weyland, Arnhem, and Herman Westmijze, Velp, Netherlands, assignors to N. V. Onderzoekingsinstituut Research, Arnhem, Netherlands, a corporation of the Netherlands
Filed June 22, 1962, Ser. No. 204,470
Claims priority, application Netherlands June 26, 1961
3 Claims. (Cl. 73—89)

The present invention relates to a novel electromechanical tensile testing apparatus of the type employing a movable clamp and a fixed clamp. More particularly, the present invention relates to testing apparatus of the type described particularly suited for the testing of textile fibers to obtain information relating to fiber tensile strength and fiber elongation.

Various tensile testing apparatus are known for the determination of the tensile strength and the elongation at break of fibers. As a matter of fact, such apparatus is used quite extensively in the textile art. Most forms of this apparatus generally record the force applied to the fiber and the elongation at break by mechanical or pneumatic arrangements, or by both; however, such apparatus has exhibited drawbacks and disadvantages which preclude precise measurements or else the apparatus is of such a complicated design that it is extremely costly and complicated to operate, requiring a skilled individual to perform the testing functions.

As known, if stringent requirements are imposed upon such apparatus to render it precise in function, the equipment usually is not of sturdy and rugged construction. Yet, if the prime consideration is simply a matter of utilizing a form of the apparatus that is rugged and sturdy, then sacrifices usually are made in the accuracy of the measuring and recording functions of the apparatus. It would seem, therefore, that following the dictates of the art, the choice becomes either to use a sturdy construction at the sacrifice of accuracy or to use a precise and accurate apparatus which is exceedingly costly to build and very difficult to operate.

A further disadvantage characterizing such testing apparatus as heretofore known is that the development of the elongation up to breakage of the fiber can only be measured and registered in a very inaccurate and haphazard fashion, if it can be registered at all.

It is the principal aim and object of the present invention to provide a tensile testing apparatus of an electromechanical nature which will overcome the disadvantages of such apparatus as was heretofore known in the prior art. Further, the principal aim of the present invention is to provide an electromechanical tensile testing apparatus of the type embodying a movable clamp and a fixed clamp between which the fiber to be tested is extended.

The fixed clamp is associated with other structure and electrical components in a highly unique way to derive an indication of the force being exerted on the fiber. The movable clamp is mechanically associated with other structure and electrical components to provide an indication of the fiber elongation. Novel electrical circuitry cooperates with the structures associated with each of the clamps to provide direct readings of tensile strength and fiber elongation.

The above and foregoing is generally accomplished by associating with the fixed clamp of the apparatus a capacitive displacement meter by means of an appropriate spring system. The fixed clamp is suspended from a spring system of precise design and mounts a capacitor plate midway between two fixed capacitor plates. The fixed clamp, during the operation of the apparatus, is permitted a slight movement or displacement, due to the spring suspension and, therefore, the capacitor plate carried by the spring system is displaced relative to the two fixed capacitor plates producing an unbalance which can be translated into a corresponding electrical signal for amplification, indication and recording. This electrical signal will be proportional to the force exerted upon the fiber undergoing test.

The concept of a capacitive displacement meter provides a construction of the tensile testing apparatus which is extremely simple and yet possesses the necessary ruggedness and sturdiness for it to be capable of use under widely varying conditions. Moreover, this arrangement has been found to produce a proportional electrical signal for displacement of the fixed clamp in a very wide measuring range. An extremely slight displacement of the fixed clamp and the associated middle capacitor plate suffices to produce a measurable unbalance in the capacitor system. Consequently, whereas the displacement of the fixed clamp is negligible relative to the displacement of the movable clamp and the elongation of the clamp fiber, nevertheless the fixed clamp moves sufficiently to produce highly accurate and reliable readings as regards the load imposed upon the fiber.

To illustrate the efficacy of this arrangement, it can be supposed that a fiber having a clamping length of about 1 cm. is subjected to a force which varies between $10^3$ and $10^5$ dynes. The breaking strength of nearly all of the occurring fibers lies within this range. As noted previously, the fixed clamp will move a slight amount, although negligible in comparison with the movement of the movable clamp and the elongation of the clamped fiber. It is possible to impose upon the system, at the outset, the necessary limitation in movement of the fixed clamp. For instance, an error in measuring the elongation of the fiber of 0.002 cm., may be tolerated. This, then, determines the extent to which the fixed clamp may be moved. Therefore, in the force range of from $10^3$ to $10^5$ dynes (the force to which the fiber will be subjected) the fixed clamp will be permitted a displacement of from $2 \times 10^{-3}$ to $2 \times 10^{-5}$ cm. Since the displacement of the fixed clamp will be within the error tolerance in measuring the elongation, the displacement of the fixed clamp is negligible and will not introduce any disturbing factor in the measurement of the elongation.

The novel capacitive displacement meter, as described above, is particularly suitable for accurately detecting the exceedingly small displacements which will be imparted to the fixed clamp. The construction of the meter is simple and fully compatible with an appropriately designed spring system which permits the displacements noted above when using the forces noted above. A distinct advantage of this arrangement is the wide range of possibly occurring forces and displacements which may be encountered, all coming within the scope of a single measuring system.

The structure associated with the movable clamp should exhibit a minimum amount of play for proper registration of displacements of the movable clamp in an accurate and reproducible manner. Accordingly, the present invention provides an accurately machined actuator to displace the movable clamp; the movable clamp is characterized by a weight much larger than the maximum tensile force exerted on the clamp during operation so that all play in the actuator for the movable clamp is eliminated towards one end. The actuator is comprised of a control mechanism adapted to lower the weighty movable clamp. Accordingly, large forces may be transferred to the clamped fiber solely by means of a low power motor driving through a control mechanism or actuator comprised of a screw spindle which carries on it a nut integrally connected with the lower movable clamp. Displacement of the movable clamp is translated into a correlated electrical signal by coupling the screw spindle to the shaft of a potentiometer across which is applied a suitable voltage.

Accordingly, it is a principal object of the present invention to provide a novel electromechanical tensile testing apparatus of the type employing a movable clamp and a fixed clamp wherein structure is associated with the fixed clamp for determining the forces applied to a clamped fiber and wherein structure is associated with the movable clamp to determine the elongation of the clamped fiber.

Another object of the present invention is a novel tensile testing apparatus of the type described wherein a unique form of a capacitive displacement meter is associated with a clamp suspended by a spring system for the purpose of developing an indication of the forces applied to the clamped fiber.

A still further object of the present invention is to provide a novel tensile testing apparatus as described previously wherein the movable clamp is characterized by a weight greater than that necessary to produce the elongation and breakage of the clamped fiber and further wherein a control mechanism is associated with the weighty movable clamp to effect the elongation of the fiber and obtain a determination thereof.

Other and further objects of the present invention will become more readily apparent from a consideration of the following detailed description of a preferred embodiment of the present invention when taken in conjunction with the appended drawings in which:

FIGURE 1 is a view, partly in section and partly in diagram of the tensile testing apparatus according to the present invention; and FIGURE 2 is a schematic diagram of the electrical portion of the present invention.

Referring to FIGURE 1, there is shown a rigid metal E frame having a vertical member 10 from which there extends laterally top and bottom elongated arms 12 and 13. Intermediate of the top and bottom arms there is provided a spring system comprising two laterally extending spring members 16 and 18 interconnected at their outer ends by a vertical connecting member 20. Depending from the lower end of member 20 is a rod 22, which extends through an opening in the lower E frame arm 13, and has secured to its lower end an upper normally fixed clamp 24 for clamping one end of the textile fiber which is to be tested.

With the above arrangement, a downward pull on clamp 24 will result in a slight vertical displacement thereof because of the spring mounting. The breaking point of substantially all fibers lies in a range between $10^3$ and $10^5$ dynes, however the allowable error in measuring the elongation of a fiber is .002 cm., and therefore the allowable displacement of the clamp 24 is $2 \times 10^{-3}$ to $2 \times 10^{-5}$ cm. To permit this displacement the spring system, comprising arms 16, 18 and connecting member 20 has a spring constant of $5 \times 10^7$ dynes/cm.

The displacement of clamp 24 is utilized to vary the potential within an electronic circuit, and to accomplish this the vertical member 20 of the spring system is the carrier for a metallic condenser plate 28 which, in repose, lies midway between two capacitor plates 32 and 34. The plate 28 is secured to and projects from the outer end of an insulating block 26, the inner end of the block being secured to the spring system member 20.

The common plate 28 is positioned midway between an upper metallic plate 32 and a lower metallic plate 34. The plate 32 is rigidly secured to the lower end of an insulating block 30, which is secured to and depends from the upper arm 12 of the E frame. The lower plate 34 is rigidly secured to the upper end of an insulating block 36, which is secured to and projects upwardly from the lower arm 13 of the E frame.

As indicated diagrammatically in FIGURE 2, the condensers 28–32 and 28–34 form a bridge with two equal resistances 70 and 72. Power from lines 60 and 62 is applied to the bridge at the junction of resistor 70 and capacitor 28–32 and the junction of resistor 72 and capacitor 28–34. Power is obtained from any alternating voltage source such as normal 110 v. 60 cycle line voltage. The bridge is grounded at the junction of resistances 70–71. It thus becomes evident that any displacement of the condenser common plate 28 will unbalance the bridge and produce a voltage at the junction of the capacitors 28–32 and 28–34. This voltage will be proportional to the displacement of clamp 24 and hence, proportional to the tensile force in fiber 14 and may be converted into a readable indication of the breaking strength of the fiber.

Displacement of clamp 24 is brought about by movement of a lower fiber clamp 38, through the clamped fiber 14 secured between the clamps; the fiber acting as a mechanical linkage therebetween. The movement of lower clamp 38 is accomplished mechanically, the clamp being rigidly secured to an arm 40, extending laterally from a worm nut 42. The worm nut 42 is mounted for vertical movement on a spindle 44. The latter may be manually rotated, but preferably it is done electrically from a fractional H.P. synchronous motor 46 through a reduction gear 48, to assure a constant rate of travel, both the motor and reduction gear being schematically shown. Any suitable supporting means for the worm nut 42 may be provided, as well as guide means for assuring vertical movement of the worm nut, but as all such means are well known, they have not been shown or described. The worm nut 42 may be replaced by a similar structure such as a fork which is engaged with the screw threads of the spindle.

In order to prevent any vertical lost motion between the worm nut 42 and spindle 44, the worm nut 42, arm 40 and clamp 38 are made sufficiently heavy to provide a weight which will always exert a downward force greater than the force required to break the largest fiber to be tested. In this manner, extreme accuracy is assured. Additionally the pitch of the thread on the spindle and worm nut is such that one revolution of the spindle causes a 110% elongation of a fiber length of 1 cm. secured between the clamps 24, 38.

The lower end of the spindle 44 is connected through any suitable linkage to the sweep arm 50 of a potentiometer 52, the terminals of the latter connecting into the power lines 60, 62 and therefore, being subjected to the same line voltage. With this construction it becomes evident that the voltage developed between one terminal of the potentiometer 52 and the sweep arm 50 will be in direct relation to the position of spindle 44 and consequently, the elongation of the clamped fiber.

As previously noted, the displacement of the clamp 24 is always negligibly small as compared with that of the clamp 38, so the position of the contact arm 50 of the potentiometer is a true measure of the extent of elongation of the clamped fiber 14.

Referring again to FIGURE 2, the electrical circuitry utilized in the present invention for the purpose of obtaining indications of the tensile forces in the fiber 14, and the extent of the elongation thereof, will be described in detail.

As previously noted, a bridge circuit is provided by resistors 70 and 72 and the capacitors 28–32 and 28–34. Unbalance of the bridge circuit is manifested by a voltage appearing at the junction between the two capacitors and this voltage is delivered to a suitable power amplifier 74 having a very high input impedance, for example, about $2 \times 10^9$ ohms. The output from amplifier 74 is delivered to the input of a second amplifier 76 by way of an adjustable R.C. coupling 78. The coupling includes a potentiometer and a capacitor and enables a phase shift correction of the signal fed to the power amplifier 74. The output from the amplifier 76 is fed to a pair of potentiometers 82 and 84, the arms of which, 86 and 88, respectively, are mounted on a common shaft and are connected as one input to a differential amplifier 80. The potentiometers enable the amplified signal to be attenuated proportional to the mass of the fiber 14.

The arm 94 of the potentiometer 96, is a second input to differential amplifier 80, and constitutes the readout for the capacitive displacement meter. By appropriate setting of the arms 86 and 88 to attenuate suitably the amplified signal, it is possible to calibrate the arm 94 to indicate the strength of the fiber 14 in grams per denier. The connection of the potentiometers 82 and 84 is such that between the denier of the fiber and the position of the contact arms 86 and 88 of these potentiometers there exists practically a logarithmic relationship. Consequently, in a large range of fiber deniers, a practically equal accuracy of adjustment of the measuring apparatus is made possible.

The terminals of the potentiometer 96 are connected directly to the lines 60 and 62. The arm 94 of this potentiometer is mechanically connected to and driven by an electrical motor 92. The potentiometer arms 86 and 88 are connected as one input to a differential amplifier 80 and the potentiometer arm 94 is connected as the second input to the differential amplifier 80. Differentials between the voltages on the potentiometer arms are utilized to control the motor current for motor 92, as schematically indicated, to cause the arrangement to function as a servomechanism. The output from the differential amplifier, if any, causes the motor 92 to drive in the proper direction, and the motor 92 in turn, mechanically drives the arm 94 (as indicated by dotted line 90) until equal voltages are fed to the differential amplifier 80. At this time, the arm 94 will be indicating the tensile forces in the fiber 14. Consequently, as the forces are built up in the fiber 14, the arm 94 will continuously indicate same by the servomechanism feedback arrangement just described.

In like manner, the voltage on the potentiometer arm 50, indicative of the state of elongation of the fiber 14, is fed as one input to a differential amplifier 110 and the voltage appearing on potentiometer arm 102 of the potentiometer 94, also placed across the lines 60 and 62, is fed as a second input to the differential amplifier 110. A differential in the inputs produces a control signal for the motor 100 which is mechanically connected (as indicated by dotted line 101) to the potentiometer arm 102, and the motor will drive the arm 102 to a position such that no differential voltage is obtained. A switch 104 is inserted in the motor circuit and is normally closed. Consequently, the potentiometer arm 102 will provide an indication of the elongation of the fiber 14.

In addition to the direct readings that are obtained by the arms 94 and 102, the apparatus is provided with a means to enable the arms 94 and 102 to remain in the positions they occupy at the moment the fiber 14 breaks. As the motor 92 drives the arm 94 upwardly, it will engage with a switch 93 by suitable mechanical means as schematically indicated by the dotted line connecting the shaft 90 and the switch 93 and maintain the switch closed. When the fiber 14 breaks and the tensile forces therein are released, the signals generated in the circuitry will cause the motor 92 to reverse direction and tend to drive the arm 94 downwardly. However, the moment the motor 92 starts to drive the arm 94 downwardly, the switch 93 will be opened causing an electrical relay 112 to be actuated to open the switch 104 cutting off the motor 100. As a result, the arm 102 will stop and remain at its last position.

The potentiometer arm 94 is provided with any suitable known magnetomechanical device to cause same to stop at its highest position. After the readings indicated by the arms 94 and 102 have been taken, they may be returned to their initial positions simply and expediently either by electrical or manual means.

It will be appreciated that suitable power supplies for the amplifiers, motors and relay are provided in a conventional way.

The arms 94 and 102 can be fitted with necessary pointers and adapted to read against suitably calibrated scales. By the same token, the arms 94 and 102 can be coupled to any suitable recorder or register so that a visual or graphic record of the quantity being measured can be obtained. The arms 94 and 102 can also be coupled to counters and may even be interconnected with a mechanism for statistically treating data whereby the quantity being measured can be automatically introduced into the mechanism and there statistically analyzed.

Although the invention has been shown and described in terms of a single preferred embodiment, it will be appreciated that various changes and modifications are possible which do not depart in spirit from the concepts and teachings of the present invention. Such changes and modifications are deemed to be within the purview of the invention.

What is claimed is:

1. An apparatus for testing the tensile strength of strand-like material having a capacitor assembly cooperating with an electric bridge comprising an integral U-shaped frame including a first and a second horizontal leg parallel to each other and a vertical yoke connecting said legs, said second leg being provided with an aperture, a first, a second and a third block, a first and a second capacitor plate, said first and said second plate being attached to said first and said second leg by means of said first and said second block respectively, a third capacitor plate, said third plate being arranged between said first and said second plate, at least one horizontal spring member, said spring member being assembled with said yoke, a vertical member being attached to said horizontal spring member, said third plate being secured to said vertical member by means of said third block, a vertical rod and a first fixed clamp, said rod penetrating said aperture and connecting said first clamp to said vertical member, a second movable clamp, said first and said second clamp adapted to receive said material therebetween, means to move said second clamp toward and away from said first clamp, means to indicate the tensile force applied to said material by said means to move said second clamp and means to indicate the elongation of said material resulting from said tensile force.

2. An apparatus as set forth in claim 1, comprising a first and a second horizontal spring member, said vertical member connecting said first and said second spring member.

3. An apparatus as claimed in claim 1, wherein said means to move said second clamp is formed by a driving motor, a gear driven by said motor, a threaded spindle driven by said gear, a nut engaging said spindle and having a weight greater than the maximum tensile force applied to said material, said nut being rigidly connected to said second movable clamp, and wherein said means to indicate said elongation comprises a potentiometer including a sweep arm, said sweep arm being secured to said spindle in a rotatable manner therewith and said potentiometer being connected to an electric circuit adapted to indicate the rotations of said spindle corresponding to the actual elongation of said material.

References Cited in the file of this patent

UNITED STATES PATENTS

| | | |
|---|---|---|
| 404,200 | Jump | May 28, 1889 |
| 2,377,869 | Elliott | June 12, 1945 |
| 2,587,628 | King | Mar. 4, 1952 |
| 3,067,607 | Crane et al. | Dec. 11, 1962 |